US012794205B2

(12) United States Patent
Bonilla et al.

(10) Patent No.: US 12,794,205 B2
(45) Date of Patent: Nov. 10, 2026

(54) ADJUSTABLE SPACING DEVICE

(71) Applicant: B/E Aerospace, Inc., Winston Salem, NC (US)

(72) Inventors: Ariane Claire Bonilla, San Pablo City (PH); Maria Milagros Ylagan Barte, Batangas City (PH)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 18/924,270

(22) Filed: Oct. 23, 2024

(65) Prior Publication Data

US 2025/0226646 A1 Jul. 10, 2025

(30) Foreign Application Priority Data

Jan. 5, 2024 (EP) .................................... 24150565

(51) Int. Cl.
*H02G 3/30* (2006.01)
*B64D 11/04* (2006.01)
(Continued)

(52) U.S. Cl.
CPC ............... *H02G 3/32* (2013.01); *B64D 11/04* (2013.01); *F16L 3/127* (2013.01); *F16L 3/13* (2013.01); *F16L 3/20* (2013.01)

(58) Field of Classification Search
CPC .... F16L 3/127; F16L 3/13; F16L 3/20; H02G 3/32; H02G 3/26; H02G 3/30; B64D 11/04
See application file for complete search history.

(56) References Cited

U.S. PATENT DOCUMENTS 5,335,754 A * 8/1994 Gibson ..................... E06C 7/44 182/205
6,138,973 A * 10/2000 Woodward .............. B63B 29/06 248/188.5
(Continued)

FOREIGN PATENT DOCUMENTS

CN 216819316 6/2022
DE 19902001 A1 * 7/2000 ............... A47F 5/13
(Continued)

OTHER PUBLICATIONS

European Patent Office; European Search Report dated Jun. 17, 2024 in Application No. 24150565.0.

*Primary Examiner* — Eret C McNichols
(74) *Attorney, Agent, or Firm* — SNELL & WILMER L.L.P.

(57) ABSTRACT

A spacing device for separating an electrical cable from an aircraft galley surface which includes an upper portion and a lower portion. The upper portion includes a distal end for attaching to the electrical cable, and a proximal end for connecting to the lower portion. The lower portion includes a distal end for attaching to the aircraft galley surface, and a proximal end for connecting to the proximal end of the upper portion. The upper portion and the lower portion are slidably connected to each other to adjust the length of the spacing device between multiple discrete lengths, and further include complementary engaging features arranged to hold the spacing device at a selected length. The complementary engaging features extend along only one side of the upper portion and the lower portion.

16 Claims, 4 Drawing Sheets

(51) Int. Cl.

| | |
|---|---|
| ***F16L 3/127*** | (2006.01) |
| ***F16L 3/13*** | (2006.01) |
| ***F16L 3/20*** | (2006.01) |
| ***H02G 3/32*** | (2006.01) |

(56) References Cited

U.S. PATENT DOCUMENTS

| | | | | |
|---|---|---|---|---|
| 7,374,131 | B2 | 5/2008 | Tiid et al. | |
| 8,152,117 | B2 | 4/2012 | Gain | |
| 8,888,053 | B2 * | 11/2014 | Blanchard | B64C 1/406 248/74.1 |
| 9,168,997 | B2 * | 10/2015 | Blanchard | H02G 3/32 |
| 9,239,126 | B2 * | 1/2016 | Adamson | F16M 11/046 |
| 9,508,472 | B2 * | 11/2016 | Deshaies | H02G 3/30 |
| 9,534,507 | B2 * | 1/2017 | Sauerhoefer | F01D 25/243 |
| 10,029,835 | B1 * | 7/2018 | Cuddy | F16L 3/2334 |
| 10,533,597 | B2 * | 1/2020 | Benthien | F16B 37/085 |
| 11,370,104 | B2 * | 6/2022 | Takada | B25G 1/06 |
| 12,501,996 | B2 * | 12/2025 | McMillan | A47B 9/14 |
| 2008/0078891 | A1 * | 4/2008 | Hobson | F16L 3/13 248/74.2 |
| 2012/0097804 | A1 * | 4/2012 | Liu | H02G 3/26 248/68.1 |
| 2020/0229549 | A1 | 7/2020 | Heineke et al. | |
| 2021/0194410 | A1 * | 6/2021 | Yang | H02S 20/23 |
| 2024/0116464 | A1 * | 4/2024 | Ogi | B60R 16/0215 |
| 2025/0122958 | A1 * | 4/2025 | Petersen | F16L 3/127 |

FOREIGN PATENT DOCUMENTS

| | | | | | |
|---|---|---|---|---|---|
| DE | 102009022175 | A1 | * | 12/2010 | B64C 1/406 |
| DE | 102015106273 | | | 10/2016 | |
| DE | 102015106273 | A1 | * | 10/2016 | H02G 3/32 |
| GB | 2205351 | A | * | 12/1988 | A01K 97/22 |
| WO | 2014035241 | | | 3/2014 | |

* cited by examiner

ADJUSTABLE SPACING DEVICE

CROSS-REFERENCE TO RELATED APPLICATIONS

This application claims priority to EP patent application Ser. No. 24150565.0, filed Jan. 5, 2024 and titled "ADJUSTABLE SPACING DEVICE," which is incorporated by reference herein in its entirety for all purposes.

FIELD

The present disclosure relates to an adjustable spacing device for cable harnesses in aircraft galleys.

BACKGROUND

Cable or wire harnesses are multi-cable assemblies of electrical conductors held together by a protective outer sheathing. The bundles of electrical conductors are configured to transmit electrical signals and/or power from one location to another, and are commonly used to connect electrical systems and components in vehicles such as aircraft. An electrically insulating material is often used for the outer sheathing and prevents the inner conducting wires from being exposed.

Cable harnesses are secured to aircraft structures using a variety of cable management devices. Installation engineers often find issues with gaps and clearances of cable harnesses on the final assembly line of aircraft galleys, which may require adjustment, redesigning and/or reworking. Similar issues may also be present during maintenance and servicing of aircraft.

Cable harnesses are usually installed and secured manually, sometimes in parts of the galley that are difficult to access. It is important to sufficiently separate and space cable harnesses from one another to prevent damage to the electrical systems via abrasion, electrical arcing, overheating and the like. It is therefore important to determine the correct cable routing and configuration in order to meet regulator specifications/requirements and OEM (original equipment manufacturer) accepted standards.

Cable harnesses can be relatively heavy yet flexible (e.g. susceptible to sagging), and so require clipping in place frequently along their length. Cables of different diameters are used throughout the aircraft, and the cables can be sensitive to pressure and bending when routed around corners and irregular surfaces.

Spacers and standoffs may be used to separate cable harnesses from the aircraft structure (e.g. a galley panel) by a specified distance. Presently, spacers and standoffs of fixed length and base diameter are used. A high number of spacers and standoffs (i.e. a large parts inventory) are therefore needed by installation and maintenance engineers to address the range of lengths and diameters required.

It is an aim to improve the electrical routing of electrical cables in an aircraft to ensure adequate spacing between adjacent cables.

SUMMARY

According to the present disclosure, there is provided a spacing device for separating an electrical cable from an aircraft galley surface, the spacing device comprising:

an upper portion; and a lower portion;

wherein the upper portion comprises:

a distal end for attaching to the electrical cable; and a proximal end for connecting to the lower portion;

wherein the lower portion comprises:

a distal end for attaching to the aircraft galley surface; and a proximal end for connecting to the proximal end of the upper portion;

wherein the upper portion and the lower portion are slidably connected to each other so to allow the length of the spacing device to be adjusted between a plurality of discrete lengths;

wherein the upper portion and the lower portion comprise complementary engaging features arranged to at least temporarily hold the spacing device at a selected one of the plurality of discrete lengths; and wherein the complementary engaging features extend along only one side of the upper portion and the lower portion.

The aircraft galley surface may include aircraft galley walls or panels forming the outer aircraft galley structure. The spacing device may be suitable for use in separating electrical cables from other surfaces in an aircraft, such as the walls of a cockpit. The spacing device may be suitable for use in other vehicles such as trains and boats, including those used as commercial passenger vehicles.

The electrical cable may be an electrical harness, comprising multiple electrical conductors, e.g. held together by a protective outer sheathing. The electrical cable may be configured to transmit electrical signals in the aircraft. The electrical cable may have a substantially circular cross-section. The electrical cable may be flexible.

The upper portion and the lower portion may define a longitudinal axis of the spacing device. The longitudinal axis may extend in a direction between the (e.g. centre of the) distal end of the upper portion and the (e.g. centre of the) distal end of the lower portion.

The upper portion and/or the lower portion may have a uniform body cross-section between their respective distal ends and proximal ends, i.e. along their lengths.

The upper portion and/or the lower portion may have a non-uniform body cross-section between their respective distal ends and proximal ends. For example, the upper portion and/or the lower portion may be tapered or comprise a flanged end.

The distal end of the lower portion may define a base of the spacing device. The base of the spacing device may correspond to the portion of the distal end of the lower portion that attaches to the aircraft galley surface.

The upper portion and the lower portion may be slidably connected along the longitudinal axis. The upper portion may be configured to slide within the lower portion, or vice versa.

The length of the spacing device may be defined as the length along the longitudinal axis, e.g. the length extending between the uppermost point of the distal end of the upper portion, and the lowermost point of the distal end of the lower portion.

The spacing device may be arranged such that the length of the spacing device is manually adjustable, e.g. by selecting and fastening between different ones of the plurality of discrete lengths. By providing a spacing device of adjustable length, the size of the parts inventory may be reduced by reducing the quantity of available spacing devices which are required on-hand.

The length of the spacing device may define the spacing of the electrical cable away from the aircraft galley surface. An adjustable length spacing device may provide for easier and quicker installation and/or maintenance of the electrical cable. Re-adjustment of the spacing device after initial installation may also be possible, such as to satisfy a change in safety regulations. This may provide for more efficient cable re-routing, increase effectiveness of cable organization, and ensure safety by preventing interference between adjacent conductors.

The length of the spacing device may be adjusted before, during and/or after the proximal end of the lower portion is fixed to the aircraft galley surface.

The complementary engaging features may be manufactured to provide the plurality of discrete lengths such that the length of the spacing device is in accordance with regulator specifications and/or manufacturer standards.

The complementary engaging features may be configured to extend linearly along one side of the upper portion and the lower portion, parallel to the longitudinal axis.

The complementary engaging features may be configured to extend along more than one side of the upper portion and the lower portion. For example, the complementary engaging features may extend linearly along two opposing sides of the upper and lower portions, symmetrically disposed about the longitudinal axis.

In some examples, the upper portion comprises a cylindrical body and the lower portion may comprise a cylindrical body.

The upper portion and the lower portion may comprise cylindrical bodies of different diameters. By providing cylindrical bodies for the upper portion and the lower portion, the two bodies may be able to rotate relative to each other about the longitudinal axis. This rotation may allow the spacing device to be secured at different selected lengths of the plurality of discrete lengths via the complementary engaging features.

The cylindrical bodies of the upper portion and the lower portion may each comprise a hollow cylindrical portion. Each hollow cylindrical portion may be concentric with each respective cylindrical body about the longitudinal axis. The cylindrical bodies of the upper portion and the lower portion may extend annularly along the longitudinal axis. Each annulus may define an outer diameter and an inner diameter for each of the upper portion and the lower portion.

The upper portion and lower portion may have a uniform cross-section of a non-circular shape, such as a triangle, rectangle or hexagon. The upper portion and lower portion may comprise prismatic bodies, the prismatic bodies having complementary cross-sections to allow for the upper and lower portions to be slidably connected to each other.

The upper portion may consist of only the body of the upper portion. The lower portion may consist of only the body of the lower portion.

The upper portion may comprise at least the body of the upper portion. The lower portion may comprise at least the body of the lower portion.

In some examples, the upper portion is arranged to slide within the lower portion.

The lower portion may be configured to receive the upper portion. The upper portion may slide along the longitudinal axis. The lower portion may act as a female connector and the upper portion may act as a male connector.

The hollow cylindrical portion of the lower portion may define a receiving bore in the cylindrical body of the upper portion. The lower portion may have an inner diameter which is greater than or substantially matches the outer diameter of the upper portion.

The lower portion may be arranged to be fixed in place to a surface (e.g. secured to the aircraft galley surface using a fastener or adhesive) such that the lower portion remains static whilst the upper portion slides relative to the surface along the longitudinal axis (i.e. perpendicular to the plane of the surface).

In some examples, the distal end of the upper portion comprises a clip for receiving the electrical cable.

The distal end of the upper portion may be configured to connect to the clip by any suitable method of fastening. In some examples, the clip is screwed or bolted to the distal end of the upper portion. In some examples, the clip is arranged to click into a groove disposed in the distal end of the upper portion. In some examples, the clip is fixed into the hollow cylindrical portion of the upper portion.

The clip may be configured to be connected to the distal end of the upper portion at one end, and to grip around an electrical cable at the other end. The clip may grip around most or all of the circumference of the electrical cable.

The clip may be configured to separate different electrical cables of different diameters from an aircraft galley surface, e.g. the clip may be flexible and, e.g. resiliently biased towards a closed configuration.

In some examples, the clip is a P-clip.

The P-clip may comprise a stem portion and a bowl portion. The P-clip may be configured to secure the electrical cable in place by receiving the cable in the bowl portion. The diameter of the bowl portion may be configured to be greater than or substantially match the diameter of the electrical cable.

An attaching fastener, such as a screw or a rivet, may be used to fasten the stem portion of the P-clip to an anchor point on the aircraft galley surface. The attaching fastener may be configured to extend through the stem portion of the P-clip, into the spacing device and out through a receiving hole in the aircraft galley surface.

The P-clip may be configured such that, in the bowl portion, the cable extends in a direction perpendicular to both the longitudinal axis and the stem portion of the P-clip.

Using a P-clip to secure the electrical cables may provide for reduced friction and unwanted movement of the electrical cable compared to other types of clips. The use of P-clips may improve safety, reduce wear and tear, and ensure smoother running of the aircraft's electrical systems.

The P-clip may be made of metal, plastic, or any other suitable material. By using a strong and durable material, the P-clip may be able to withstand external forces (such as those resulting from turbulence) to ensure the cable is secured in place.

In some examples, the distal end of the lower portion comprises a flange having a base for connecting to the aircraft galley surface. A surface area of the base of the flange may be greater than a cross-sectional area of the proximal end of the lower portion.

The base of the flange may correspond to portion of the flange which attaches to the aircraft galley surface. The base of the flange may define the base of the spacing device, and the surface area of the base of the flange may be equal to the surface area of the base of the spacing device.

The flange may have any suitably shaped base. In some examples, the flange has a circular or substantially circular base. In some examples, the flange has a triangular, rectangular or hexagonal base.

By providing a flange with a greater base surface area than the cross-sectional area of the proximal end of the lower portion, the surface area of the base of the spacing device may be increased. Providing a larger spacing device base may provide a more stable spacing device by reducing precession about the longitudinal axis. Providing a larger spacing device base may also improve ease of installation of the spacing device, for example when fixing the lower portion to the aircraft galley surface using a fastener or adhesive.

In some examples, the lower portion comprises an attachment bore for inserting an attaching fastener to connect the distal end of the lower portion to the aircraft galley surface.

The attachment bore of the lower portion may be located at the distal end of the lower portion. The attachment bore may have any suitable cross-section, such as a circle, cross or square. The attachment bore may have any suitable length and cross-sectional area, which may be larger, smaller or substantially the same as the receiving bore of the lower portion.

The aircraft galley surface may comprise a receiving hole for receiving the attaching fastener. The receiving hole may be threaded or non-threaded. The receiving hole may penetrate completely through the aircraft galley surface, i.e. an opening passing through the entire depth of an aircraft galley panel. The receiving hole may penetrate only partially into the aircraft galley surface. The receiving hole may substantially match the size and shape of the attachment bore.

The attaching fastener may be a screw, a rivet, a bolt or any other suitable removable fastener. The attaching fastener may be used to removably secure the spacing device to the aircraft galley surface.

In some examples, the attaching fastener is configured to extend from within the lower portion, through the attachment bore in the lower portion, and into the receiving hole of the aircraft galley surface.

In some examples, the attachment bore of the lower portion may not be required to secure the spacing device using a removable fastener. The attaching fastener may be configured to extend from within the lower portion (e.g. within the receiving bore of the lower portion) directly into the receiving hole of the aircraft galley surface.

In some examples, the attaching fastener is configured to extend through the upper portion, e.g. as well as through the lower portion. The upper portion may comprise an attachment bore at its distal end, distinct from the attachment bore of the lower portion. The attaching fastener may be configured to extend through the attachment bore of the upper portion, through the receiving bore of the lower portion, optionally through the attachment bore of the lower portion, and into the receiving hole of the aircraft galley surface.

In some examples, the attachment bore of the upper portion is the hollow cylindrical portion of the upper portion. The attaching fastener may be configured to extend through the hollow cylindrical portion of the upper portion, through the receiving bore of the lower portion, optionally through the attachment bore of the lower portion, and into the receiving hole of the aircraft galley surface.

The spacing device may be secured to the aircraft galley surface using an adhesive. The adhesive may be applied to the base of the spacing device, e.g. the base of the distal end of the lower portion. The adhesive may be applied to the portion of the aircraft galley surface to which the spacing device is intended to be secured. The adhesive may be removable or permanent.

In some examples, the complementary engaging features comprise a plurality of complementary engaging features on one of the lower portion and the upper portion and only a single complementary engaging feature on the other of the upper portion and the lower portion.

The length of the spacing device may be adjusted and fixed at the location of the single complementary engaging feature. By providing a plurality of complementary engaging features on one portion, and only a single complementary engaging feature on the other portion, adjusting the length of the spacing device may be made more intuitive for the user.

In some examples, the complementary engaging features comprise complementary holes on the lower portion and the upper portion, and a connecting fastener arranged to extend between one of the complementary holes on the lower portion and one of the complementary holes on the upper portion.

The complementary holes may extend linearly along one side of the upper portion and the lower portion, parallel to the longitudinal axis. The complementary holes may all have the same diameter.

The connecting fastener may be a grub screw, a turn screw, or any other suitable insertable fastener suitable for extending between the complementary holes on the lower portion and the upper portion. The connecting fastener may be removable.

The length of the spacing device may be fixed by sliding the upper portion within the lower portion such that one of the complementary holes on the lower portion aligns with one of the complementary holes on the upper portion, then holding the upper and lower portions in place whilst inserting the connecting fastener first through the (outer) complementary hole on the lower portion then through the (inner) complementary hole on the upper portion.

The length of the spacing device may be adjusted by removing (e.g. unscrewing or pulling out) the connecting fastener, sliding the upper portion within the lower portion such that different complementary holes on the lower and upper portions are aligned, then re-inserting the connecting fastener through the different aligned complementary holes in the lower and upper portions.

Providing complementary engaging features that comprise complementary holes results in a spacing device which is simple and intuitive to use and adjust in length.

In some examples, the complementary engaging features comprise one or more protrusions on one of the lower portion and the upper portion, and one or more complementary recesses on the other of the upper portion and the lower portion. The one or more protrusions are arranged to engage with the one or more complementary recesses.

The one or more protrusions on one portion may engage by moving into the one or more complementary recesses on the other portion, such that the spacing device is secured at one of the plurality of discrete lengths.

The complementary recesses may be shaped, angled or configured such that when the portion on which the one or more protrusions is disposed is turned or lifted, the one or more protrusions are pushed out of their respective recesses onto a runway (e.g. a groove). When the portion is further turned or lifted, the protrusions may then run along the runway to eventually engage with another one of the one or more complementary recesses. The runway may extend parallel to the longitudinal axis.

By providing complementary engaging features which comprise protrusions on one portion and complementary recesses on the other portion, the length of the spacing device may be adjusted whilst reducing slippage and preventing unintended adjustment of the length of the spacing device.

In some examples, the complementary engaging features comprise a latch having a plurality of engaging positions.

The latch may be located on and/or fixed to the lower portion, and the engaging positions may be located on the upper portion, or vice versa. The latch may removably fasten onto each of the plurality of engaging positions.

The plurality of engaging positions may comprise recesses or holes. The plurality of engaging positions may correspond to the plurality of discrete lengths.

By providing a latch which can engage with a plurality of engaging positions, the length of the spacing device may be fixed securely for a desired duration of time.

In some examples, the complementary engaging features comprises a linear ratchet on one of the lower portion and the upper portion, and a pawl on the other of the upper portion and the lower portion.

The pawl may be configured to move linearly along a runway of the linear ratchet. The runway may extend parallel to the longitudinal axis. The linear ratchet may comprise, disposed on the runway, angled teeth up and over which the pawl may slide in one direction. The angled teeth may be shaped or configured such that, once the pawl has fallen into place, it is prevented from moving in the reverse direction along the runway.

By using a linear ratchet and pawl configuration, the upper portion is restricted to sliding in only one direction relative to the lower portion, or vice versa. This may reduce slippage and prevent unintended adjustment of the length of the spacing device.

In some examples, the upper portion and the lower portion are arranged to be rotatable relative to each other so as to secure the spacing device at a selected one of the plurality of discrete lengths.

The upper portion and the lower portion may be configured to rotate about the longitudinal axis.

Rotation of the upper portion and the lower portion relative to each other may only be possible when the lower and upper portions are aligned relative to each other such that they are disposed at one of the plurality of discrete lengths.

A rotation in one direction may move the upper portion and the lower portion into a locked position such that together such that they are prevented from moving relative to each other along the longitudinal axis. The upper portion and the lower portion may only be released from the locked position when they are rotated in the opposite direction relative to each other into an unlocked position.

In some examples, the complementary engaging features comprise one or more protrusions on one of the lower portion and the upper portion, and a longitudinal groove on the other of the upper portion and the lower portion. The longitudinal groove may extend in a direction parallel to a direction in which the length of the spacing device is adjusted. The complementary engaging features may further comprise a plurality of lateral grooves extending perpendicularly from the longitudinal groove. The upper portion and the lower portion may be arranged to be rotatable relative to each other so as to move the one or more protrusions into one or more of the plurality of lateral grooves so as to secure the spacing device at a selected one of the plurality of discrete lengths.

The plurality of lateral grooves may each be configured in an L-shape to provide a plurality of lock grooves in the arm of the L-shape. The plurality of lock grooves are sized to prevent the protrusion from slipping out and translation along the longitudinal axis.

In some examples, the spacing device is arranged to be adjusted at least between a length of 15 mm and 25 mm, e.g. at least between a length of 10 mm and 30 mm, e.g. at least between a length of 5 mm and 35 mm.

The plurality of discrete lengths may be limited to between three and five discrete lengths, to help manual operation of the spacing device remain practical, e.g. at lengths of the spacing device between 15 mm and 25 mm.

In some examples, the spacing device comprises a spring arranged to bias the upper portion and the lower portion away from each other.

The spring may be attached to the upper portion and/or to the lower portion. The attachment may be fixed (e.g. welded or using an adhesive), or the attachment may be removable (e.g. using a clip or screw). The spring may extend within the hollow cylindrical portion(s) of the upper portion and/or the lower portion.

The spring may enable the complementary engaging features to releasably hold the spacing device at a selected one of the plurality of the discrete lengths. Biasing the upper portion and the lower portion away from each other when the spring is released may improve manual operation by reducing the force needed to adjust the length of the spacing device.

When the length of the spacing device is at a minimum (i.e. the proximal end of the upper portion is fixed closest to the distal end of the lower portion), the spring may be in its most compressed state and the upper portion may be ejected away from the lower portion. When the length of the spacing device is at a maximum (i.e. the proximal end of the upper portion is fixed closest to the proximal end of the lower portion), the spring may be in its most extended state.

The spring may be any biasing member or mechanism suitable for biasing the upper portion and the lower portion away from each other. The spring may be made of spring steel, metal alloy, or any other suitable material.

Features of any aspect or example described herein may, wherever appropriate, be applied to any other aspect or example described herein. Where reference is made to different examples or sets of examples, it should be understood that these are not necessarily distinct but may overlap.

BRIEF DESCRIPTION OF THE DRAWINGS

One or more non-limiting examples will now be described, by way of example only, and with reference to the accompanying figures in which.

DETAILED DESCRIPTION

Figure 1:
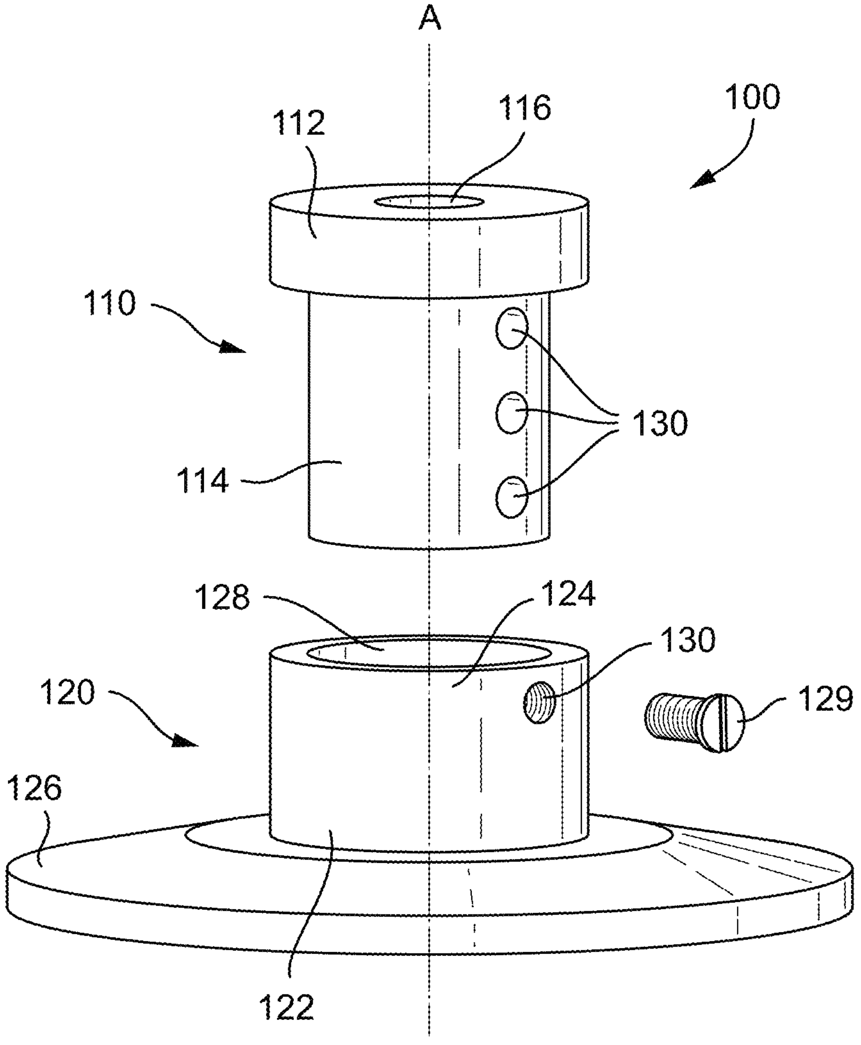
FIG. 1 shows a screw-type adjustable spacing device.

The examples described herein are used for separating and spacing electrical cables in aircraft galleys, but other applications are also envisaged and the examples are not limited to this use. FIG. 1 shows a spacing device 100 for separating an electrical cable from an aircraft galley surface. The spacing device 100 is a screw-type standoff comprising at least an upper portion 110 and a lower portion 120.

The upper portion 110 comprises a distal end 112 for attaching to the electrical cable, and a proximal end 114 for connecting to the lower portion 120.

The lower portion 120 comprises a distal end 122, and a proximal end 124 for connecting to the proximal end of the upper portion 114. The distal end of the lower portion 122 comprises a flange 126 having a circular base for attaching to the aircraft galley surface. The flange may be attached using a fastener or an adhesive. The surface area of the base of the flange 126 is greater than the cross-sectional area of the proximal end of the lower portion 124.

The upper portion 110 and the lower portion 120 define a longitudinal axis A of the spacing device. The longitudinal axis A extends along the line defined from the distal end of the upper portion 112 to the distal end of the lower portion 122.

The upper portion 110 and the lower portion 120 each have a cylindrical body and are slidably connected to each other. The cylindrical body of the upper portion is configured to slide within the cylindrical body of the lower portion along the longitudinal axis A. The cylindrical body of the upper portion and the cylindrical body of the lower portion are configured to rotate relative to each other about the longitudinal axis A.

The lower portion 120 has a hollow cylindrical portion concentric with its cylindrical body, which defines a receiving bore 128 configured to slidably receive the upper portion 110.

The upper portion 120 has a hollow cylindrical portion concentric with its cylindrical body. The hollow cylindrical portion of the upper portion defines an attachment bore 116 which is configured to receive an attaching fastener. This will be described in more detail with reference to FIGS. 4A and 4B.

The upper portion 110 and the lower portion 120 further comprise complementary engaging features 130 which are arranged to temporarily hold the spacing device 100 at a selected one of a plurality of discrete lengths. The complementary engaging features 130 comprise a single hole on the lower portion and a plurality of complementary holes extending linearly along one side of the upper portion. The plurality of complementary holes on the upper portion correspond to the plurality of discrete lengths.

The length of the spacing device is fixed by sliding the upper portion 110 within the lower portion 120 such that the single hole on the lower portion aligns with one of the complementary holes on the upper portion. The upper portion 110 and the lower portion 120 are held in place whilst a connecting fastener 129 is inserted first through the single hole on the lower portion and then through the complementary hole on the upper portion. The connecting fastener is a removable grub screw.

The length of the spacing device is changed by removing (e.g. unscrewing or pulling out) the connecting fastener 129, sliding the upper portion 110 within the lower portion 120 such that a different complementary hole of the upper portion is aligned with the single hole of the lower portion, then re-inserting the connecting fastener 129 through the aligned holes.

The length of the spacing device is therefore adjusted by sliding and fastening in place the upper portion 110 relative to the lower portion 120. The length of the spacing device may be adjusted before, during and/or after the proximal end of the lower portion 122 is fixed to the aircraft galley surface.

The length of the spacing device is adjusted at least between 15 mm and 25 mm (e.g. at least between a length of 10 mm and 30 mm, e.g. at least between a length of 5 mm and 35 mm).

Figure 2:
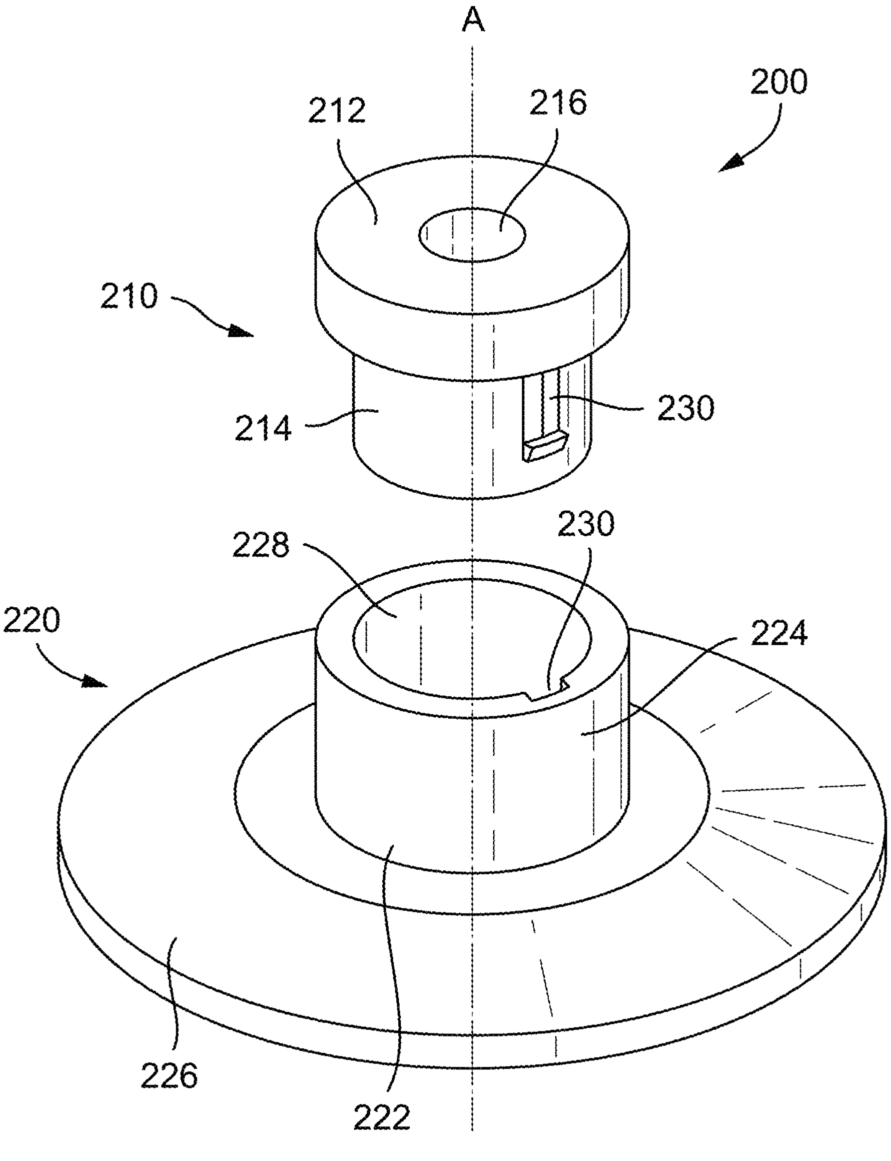
FIG. 2 shows a spring-type adjustable spacing device.

FIG. 2 shows a spacing device 200 for separating an electrical cable from an aircraft galley surface. The spacing device 200 is a spring-type standoff comprising at least an upper portion 210 and a lower portion 220.

Many of the following features of the spacing device 200 have been described above with reference the spacing device 100 of FIG. 1, and are repeated below with reference to FIG. 2.

The upper portion 210 comprises a distal end 212 for attaching to the electrical cable, and a proximal end 214 for connecting to the lower portion 220.

The lower portion 220 comprises a distal end 222, and a proximal end 224 for connecting to the proximal end of the upper portion 214. The distal end of the lower portion 222 comprises a flange 226 having a circular base for attaching to the aircraft galley surface. The flange may be attached using a fastener or an adhesive. The surface area of the base of the flange 226 is greater than the cross-sectional area of the proximal end of the lower portion 224.

The upper portion 210 and the lower portion 220 define a longitudinal axis A of the spacing device. The longitudinal axis A extends along the line defined from the distal end of the upper portion 212 to the distal end of the lower portion 222.

The upper portion 210 and the lower portion 220 each have a cylindrical body and are slidably connected to each other. The cylindrical body of the upper portion is configured to slide within the cylindrical body of the lower portion along the longitudinal axis A. The cylindrical body of the upper portion and the cylindrical body of the lower portion are configured to rotate relative to each other about the longitudinal axis A.

The lower portion 220 has a hollow cylindrical portion concentric with its cylindrical body, which defines a receiving bore 228 configured to slidably receive the upper portion 210.

The upper portion 220 has a hollow cylindrical portion concentric with its cylindrical body. The hollow cylindrical portion of the upper portion defines an attachment bore 216 which is configured to receive an attaching fastener. This will be described in more detail with reference to FIGS. 4A and 4B.

The upper portion 210 and the lower portion 220 further comprise complementary engaging features 230 which are arranged to temporarily hold the spacing device 200 at a selected one of a plurality of discrete lengths. The configuration and function of the complementary engaging features 230 will be described in more detail with reference to FIG. 3.

Figure 3:
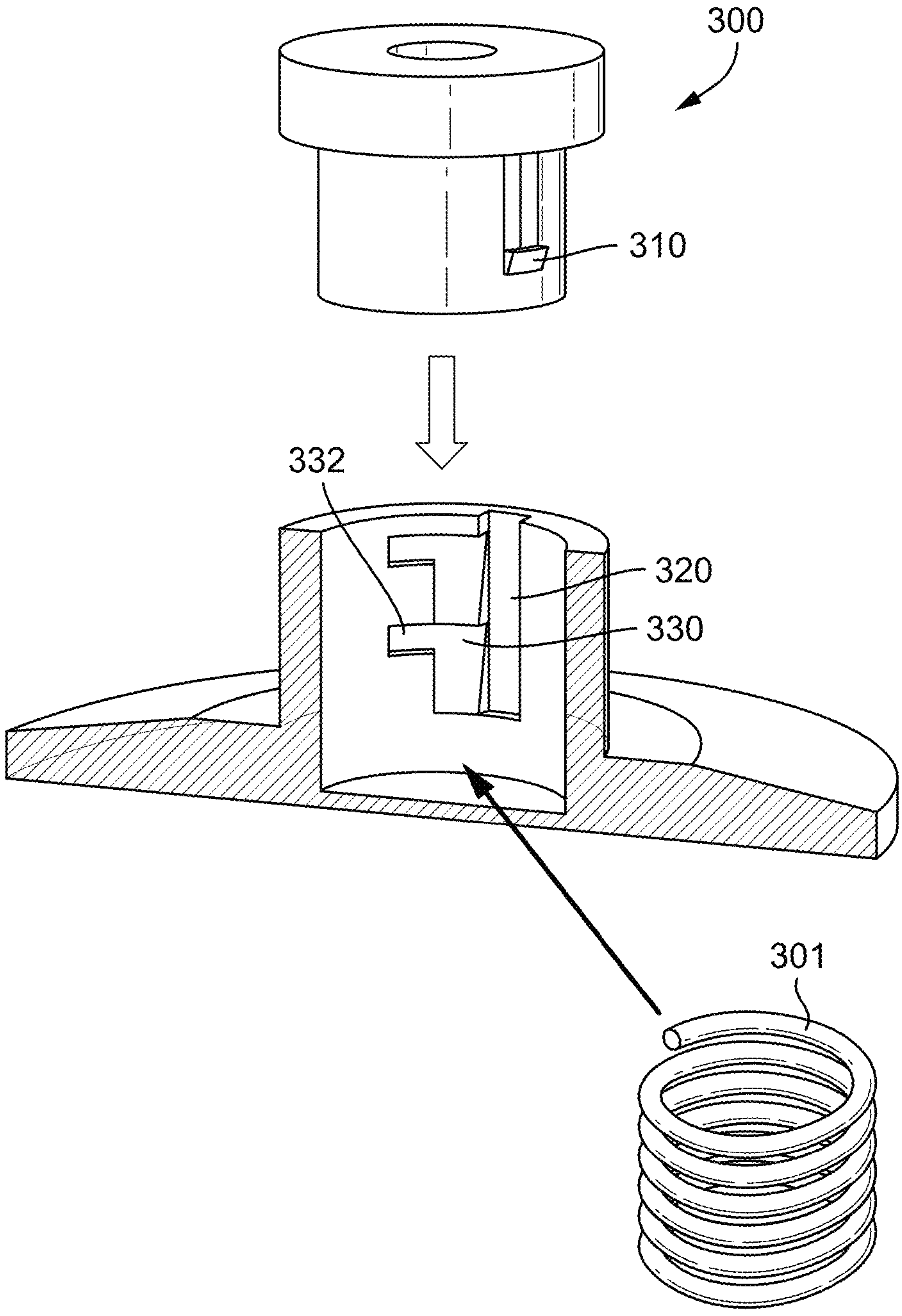
FIG. 3 shows an internal mechanism for the spring-type adjustable spacing device of FIG. 2.

FIG. 3 shows an internal mechanism 300 for the spring-type adjustable spacing device 200. The internal mechanism 300 comprises complementary engaging features 230 and spring 301.

The complementary engaging features 230 comprises a single protrusion 310 on the upper portion, and a longitudinal groove 320 on the lower portion. The longitudinal groove extends in a direction parallel the longitudinal axis A.

The complementary engaging features 230 further comprises a plurality of lateral grooves 330 extending perpendicularly from the longitudinal groove 320. The plurality of lateral grooves 330 are also disposed on the lower portion and correspond to the plurality of discrete lengths of the spacing device 200. The plurality of lateral grooves 330 are L-shaped such that they comprise a plurality of lock grooves 332 in the arm of the L-shape.

The length of the spacing device is fixed by moving the protrusion 310 along the longitudinal groove 320 and then rotating the protrusion 310 in one direction into a selected one of the plurality of lateral grooves 330. A click may be heard when the protrusion is moved into the one of the plurality of lateral grooves 330. The protrusion is then further rotated in the same direction into the corresponding one of the plurality of lock recesses 332 so as to lock the spacing device at a selected one of the plurality of discrete lengths.

The length of the spacing device is changed by rotating the protrusion 310 in the opposite direction out of the corresponding one of the plurality of lock recesses 332, then further rotated in the same direction out of the selected one of the plurality of lateral grooves 330 until the protrusion 310 rests on the longitudinal groove 320. The upper portion 210 is then slid within the lower portion 220, and thus the protrusion 310 is slid along the longitudinal groove 320, until the protrusion 310 is aligned with a different selected one of the plurality of lateral grooves 330. The protrusion 310 is then rotated into the selected one of the plurality of lateral grooves 330 and further rotated into the corresponding one of the plurality of lock recesses 332.

The plurality of lock grooves 332 are sized such that the protrusion 310 is prevented from slipping out, and thus prevented from translating along the longitudinal axis A, unless it is rotated out of the one of the plurality of lock grooves 332.

The length of the spacing device is therefore adjusted by sliding, rotating and locking in place the upper portion 210 relative to the lower portion 220. The length of the spacing device may be adjusted before, during and/or after the proximal end of the lower portion 222 is fixed to the aircraft galley surface.

The length of the spacing device is adjusted at least between 15 mm and 25 mm (e.g. at least between a length of 10 mm and 30 mm, e.g. at least between a length of 5 mm and 35 mm).

Figure 4A:
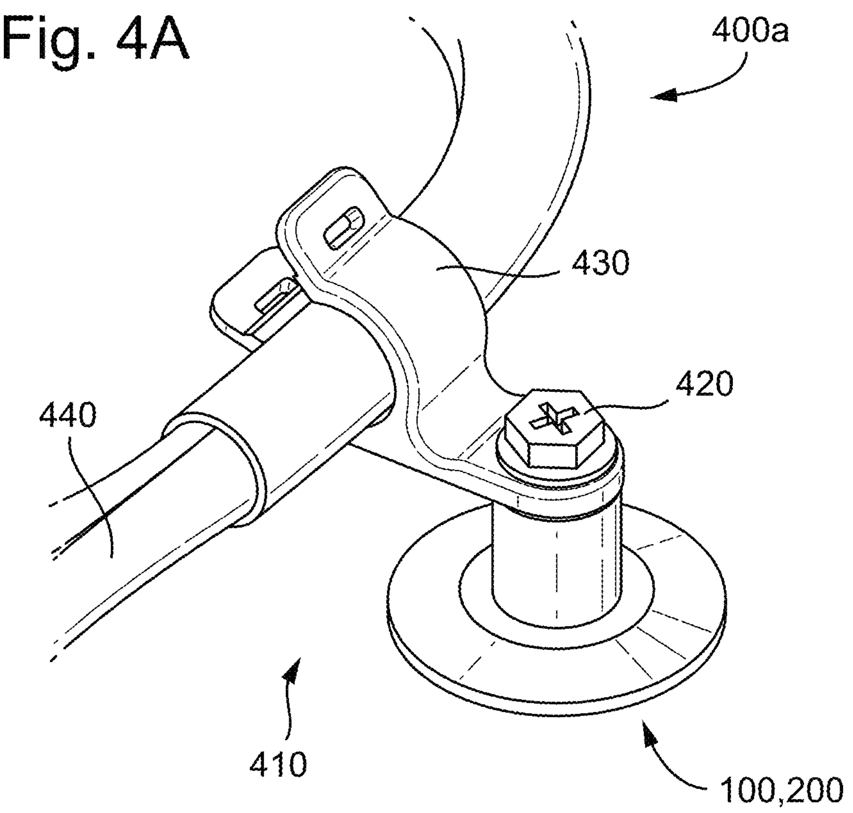
FIG. 4A shows an adjustable standoff spacing device in use.

FIG. 4A shows an assembly 400*a* in which the spacing device 100, 200 is attached to an electrical cable 440 via a clip 430, and also to an aircraft galley surface 410. The clip 430 is configured to receive the electrical cable 440.

The clip 430 is configured to be connected to the distal end of the upper portion 112, 212 at one end, and to grip around an electrical cable 440 at the other end. The clip 430 is screwed or bolted to the distal end of the upper portion 112, 212. The clip 430 grips around most or all of the circumference of the electrical cable 440.

The clip 430 is a P-clip comprising a stem portion and a bowl portion. The bowl portion receives the electrical cable 440 and secures the cable in place. The diameter of the bowl portion is configured to substantially match the diameter of the electrical cable 440.

An attaching fastener 420, such as a screw or a rivet, is configured to removably secure the spacing device 100, 200 to the aircraft galley surface 410. The attaching fastener 420 is configured to extend through the stem portion of the P-clip 430, into the spacing device 100, 200 (i.e. through the attachment bore of the upper portion 116, 216 and the receiving bore of the lower portion 128, 228) and out through a receiving hole in the aircraft galley surface 410.

When the receiving bore of the lower portion 128, 228 does not extend through to the base of the distal end, the distal end of the lower portion 122, 222 may additionally comprise an attachment bore (not shown) through which the attaching fastener 420 is configured to extend.

The spacing device 100, 200 may also be secured to the aircraft galley surface 410 using an adhesive.

Figure 4B:
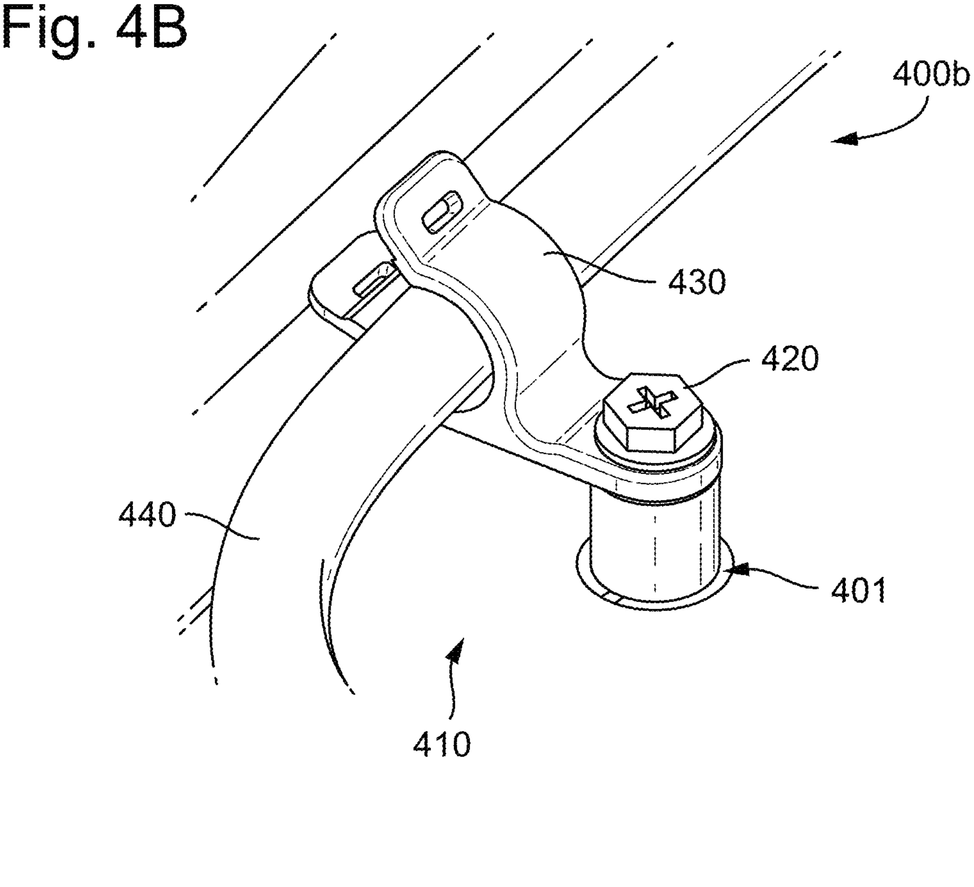
FIG. 4B shows an adjustable spacer spacing device in use.

FIG. 4B shows an assembly 400*b* in which a spacing device 401 is attached to an electrical cable 440 via a clip 430, and also to an aircraft galley surface 410. The clip 430 is configured to receive the electrical cable 440.

The spacing device 401 is identical in geometry and configuration to the spacing device 100, 200 of FIG. 4A except the distal end of the lower portion does not comprise a flange.

The clip 430 is configured to be connected to the distal end of the upper portion at one end, and to grip around an electrical cable 440 at the other end. The clip 430 is screwed or bolted to the distal end of the upper portion. The clip 430 grips around most or all of the circumference of the electrical cable 440.

The clip 430 is a P-clip comprising a stem portion and a bowl portion. The bowl portion receives the electrical cable 440 and secures the cable in place. The diameter of the bowl portion is configured to substantially match the diameter of the electrical cable 440.

An attaching fastener 420, such as a screw or a rivet, is configured to removably secure the spacing device to the aircraft galley surface 410. The attaching fastener 420 is configured to extend through the stem portion of the P-clip 430, into the spacing device and out through a receiving hole in the aircraft galley surface 410.

When the receiving bore of the lower portion does not extend through to the base of the distal end, the distal end of the lower portion may additionally comprise an attachment bore (not shown) through which the attaching fastener 420 is configured to extend.

It will be appreciated by those skilled in the art that the disclosure has been illustrated by describing one or more specific examples thereof, but is not limited to these examples; many variations and modifications are possible, within the scope of the accompanying claims.

What is claimed is:

1. A spacing device for separating an electrical cable from an aircraft galley surface, comprising:
- an upper portion;
- a lower portion; and
- a spring arranged to bias the upper portion and the lower portion away from each other;
- wherein the upper portion comprises:
  - a distal end for attaching to the electrical cable; and
  - a proximal end for connecting to the lower portion;
- wherein the lower portion comprises:
  - a distal end for attaching to the aircraft galley surface; and
  - a proximal end for connecting to the proximal end of the upper portion;
- wherein the upper portion and the lower portion are slidably connected to each other so to allow the length of the spacing device to be adjusted between a plurality of discrete lengths;
- wherein the upper portion and the lower portion comprise complementary engaging features arranged to at least temporarily hold the spacing device at a selected one of the plurality of discrete lengths; and
- wherein the complementary engaging features extend along only one side of the upper portion and the lower portion.

2. The spacing device as claimed in claim 1, wherein the upper portion comprises a cylindrical body and the lower portion comprises a cylindrical body.

3. The spacing device as claimed in claim 1, wherein the upper portion is arranged to slide within the lower portion.

4. The spacing device as claimed in claim 1, wherein the distal end of the upper portion comprises a clip for receiving the electrical cable.

5. The spacing device as claimed in claim 1, wherein the distal end of the lower portion comprises a flange having a base for attaching to the aircraft galley surface; and wherein a surface area of the base of the flange is greater than a cross-sectional area of the proximal end of the lower portion.

6. The spacing device as claimed in claim 1, wherein the lower portion comprises an attachment bore for inserting an attaching fastener to attach the distal end of the lower portion to the aircraft galley surface.

7. The spacing device as claimed in claim 1, wherein the complementary engaging features comprise a plurality of complementary engaging features on one of the lower portion and the upper portion and only a single complementary engaging feature on the other of the upper portion and the lower portion.

8. The spacing device as claimed in claim 1, wherein the complementary engaging features comprise:

complementary holes on the lower portion and the upper portion; and a connecting fastener arranged to extend between one of the complementary holes on the lower portion and one of the complementary holes on the upper portion.

9. The spacing device as claimed in claim 1, wherein the complementary engaging features comprise:

one or more protrusions on one of the lower portion and the upper portion; and one or more complementary recesses on the other of the upper portion and the lower portion;

wherein the one or more protrusions are arranged to engage with the one or more complementary recesses.

10. The spacing device as claimed in claim 1, wherein the complementary engaging features comprise a latch having a plurality of engaging positions.

11. The spacing device as claimed in claim 1, wherein the complementary engaging features comprise:

one or more protrusions on one of the lower portion and the upper portion; and a longitudinal groove on the other of the upper portion and the lower portion.

12. The spacing device as claimed in claim 11, wherein the longitudinal groove extends in a direction parallel to a direction in which the length of the spacing device is adjusted;

wherein the complementary engaging features further comprise:

a plurality of lateral grooves extending perpendicularly from the longitudinal groove;

wherein the upper portion and the lower portion are arranged to be rotatable relative to each other so as to move the one or more protrusions into one or more of the plurality of lateral grooves so as to secure the spacing device at a selected one of the plurality of discrete lengths.

13. The spacing device as claimed in claim 1, wherein the upper portion and the lower portion are arranged to be rotatable relative to each other so as to secure the spacing device at a selected one of the plurality of discrete lengths.

14. The spacing device as claimed in claim 1, wherein the spacing device is arranged to be adjusted at least between a length of 15 mm and 25 mm.

15. The spacing device as claimed in claim 1, wherein the spacing device is arranged to be adjusted at least between a length of 10 mm and 30 mm.

16. The spacing device as claimed in claim 1, wherein the spacing device is arranged to be adjusted at least between a length of 5 mm and 35 mm.

* * * * *